United States Patent [19]
Saliba

[11] Patent Number: 6,018,434
[45] Date of Patent: Jan. 25, 2000

[54] TAPE CARTRIDGE HAVING WRITTEN-IN-DEFECT SERVO PATTERNS FOR RAPID HEAD POSITION CALIBRATION

[75] Inventor: George A. Saliba, Northborough, Mass.

[73] Assignee: Quantum Corporation, Milpitas, Calif.

[21] Appl. No.: 08/782,183

[22] Filed: Jan. 14, 1997

[51] Int. Cl.[7] ................................................. G11B 5/584
[52] U.S. Cl. ................................... 360/77.13; 360/74.6
[58] Field of Search .................................. 360/75, 77.01,
360/77.12, 77.13, 74.5, 74.6

[56] References Cited

U.S. PATENT DOCUMENTS

| | | | |
|---|---|---|---|
| 4,563,713 | 1/1986 | Cahoon et al. ................. | 360/77.12 X |
| 4,843,490 | 6/1989 | Haragushi ....................... | 360/69 |
| 4,863,114 | 9/1989 | Moeller et al. .................. | 242/188 |
| 5,327,305 | 7/1994 | Thomas .......................... | 360/74.5 |
| 5,349,484 | 9/1994 | Koehler .......................... | 360/77.12 |
| 5,371,638 | 12/1994 | Saliba ............................. | 360/77.12 |
| 5,448,426 | 9/1995 | Dahlerud ......................... | 360/69 |
| 5,689,384 | 11/1997 | Albrecht et al. ................. | 360/77.12 |
| 5,726,824 | 3/1998 | Ayres et al. ..................... | 360/77.12 |

*Primary Examiner*—Andrew L. Sniezek
*Attorney, Agent, or Firm*—Robert V. Klawzinski; David B. Harrison; Debra A. Chun

[57] ABSTRACT

A magnetic storage tape includes a plurality of spaced-apart servo reference patterns formed along a longitudinal reference axis. The patterns result in a predetermined pattern of coherent magnetic signal disturbances to magnetic tracks written and read across the patterns. The tape drive decodes the disturbance pattern into a position error signal. A tape drive head position servo iteratively adjusts lateral position of a magnetic head relative to the tape, based on sequentially developed position error signals in order to bring the head rapidly into precise alignment with the longitudinal reference axis. A method for forming the reference patterns into the tape with laser beam ablation is also disclosed.

8 Claims, 5 Drawing Sheets

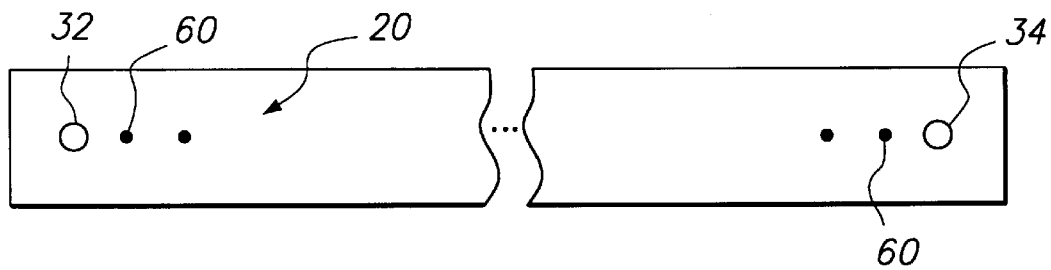
FIG. 2a
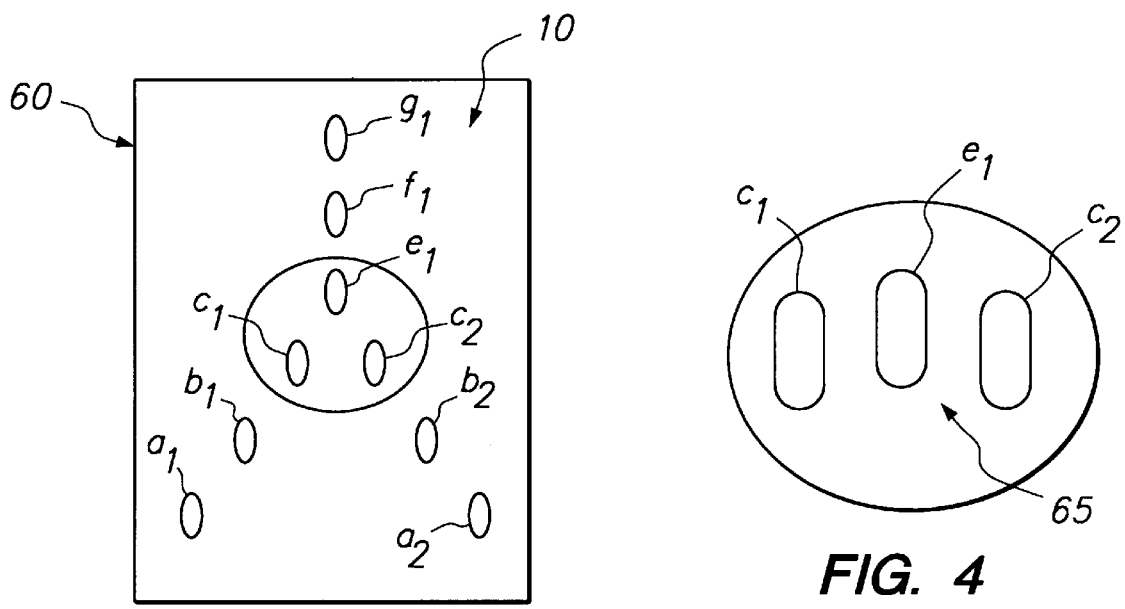
FIG. 3
FIG. 4
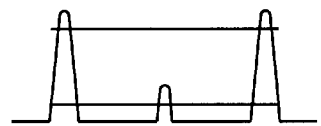
FIG. 5

TAPE CARTRIDGE HAVING WRITTEN-IN-DEFECT SERVO PATTERNS FOR RAPID HEAD POSITION CALIBRATION

FIELD OF THE INVENTION

The invention relates generally to magnetic tape storage subsystems, and more particularly to a tape cartridge having written-in-defect servo patterns enabling a tape storage subsystem to calibrate a magnetic tape read/write head relative to the tape within a minimal time.

BACKGROUND OF THE INVENTION

The present invention is particularly useful within the environment of a digital tape recording system employing a single-reel tape cartridge. In one pertinent form, a magnetic tape drive storage subsystem for handling a single-reel tape cartridge is shown in FIG. 1. The FIG. 1 subsystem is generally comprised of a rectangular housing that has a common base carrying two spindle motors. A first spindle motor rotates a permanently mounted take-up reel dimensioned to accept a relatively high speed streaming magnetic tape. A second spindle is adapted to rotate a feed reel of the single-reel removable tape cartridge. The removable tape cartridge is manually or automatically inserted into the FIG. 1 tape drive via a suitably-dimensioned slot formed in the drive's housing. Upon insertion of the tape cartridge into the slot, the cartridge tape feed reel becomes engaged by the second spindle motor. However, prior to synchronized rotation of the first and second spindle motors, the tape cartridge leader becomes automatically buckled to a drive leader extending from the take-up reel along the tape path within the drive. A mechanical buckling mechanism, as shown and described in commonly owned, copending U.S. patent application Ser. No. 08/666,854, entitled, "Improved Tape Buckling Mechanism For Single Reel Cartridge Tape Recording" is presently preferred as the buckling mechanism for coupling and uncoupling the tape drive and cartridge leaders. The disclosure of U.S. patent application Ser. No. 08/666,854 is hereby incorporated herein by reference.

A number of rollers are positioned along the tape path between the tape cartridge and the take-up reel guide the magnetic tape as it traverses at relatively high speeds (e.g. 100 inches per second or faster) back and forth between the tape cartridge and the permanently mounted spool. The tape drive further comprises a read/write head mounted on a tape head carriage-actuator assembly which is also located between the take-up reel and the tape cartridge tape feed reel. As shown for example in commonly assigned U.S. Pat. No. 5,371,638, the tape head is positioned laterally and rotationally relative to the tape, thereby enabling recording and playback on a multiplicity of parallel longitudinal data tracks in either a non-azimuthal or an azimuthal recording pattern. The disclosure of U.S. Pat. No. 5,371,638 is incorporated herein by reference. A bidimensionally operable tape head carriage is described in commonly assigned, copending U.S. patent application Ser. No. 08/557,662 filed on Nov. 13, 1995, for "Tape Drive Head Positioning Device for Adjusting Head Tilt and Azimuth", the disclosure thereof being incorporated herein by reference.

During operation, the magnetic tape streams back and forth at high speed between the take-up spool and the tape cartridge along the defined tape path. Further, as the tape streams back and forth, the read/write head stores or retrieves data to/from the magnetic tape. One beguiling difficulty of high speed lineal streaming tape is that of lateral tape motions or displacements at the head as the tape streams by in forward or reverse direction during operation of the tape drive. As the number of lineal tracks is increased without any corresponding increase in tape width, in order to gain increased data storage density, lateral tape motion becomes very problematic. One way to compensate for lateral tape motion or "LTM" is to provide a sequence of head position calibration routines once a cartridge is loaded into the tape drive.

During initialization of the tape drive following loading of a tape cartridge, a number of diagnostic processes are executed. One important and conventionally time-consuming routine is finding or establishing calibration tracks located in a header area before the beginning-of-tape (BOT) hole or in a trailer region after the end-of-tape (EOT) hole. Magnetic tapes generally comprise at least two calibration tracks, one for calibrating head initial position in a forward tape direction, and one for calibrating head initial position in a reverse tape direction. Specifically, the read/write head must first find a tape edge and then traverse the tape to determine if the tape has previously written calibration tracks. If the calibration tracks have previously been written, then the head servo adjusts head position to follow these tracks, so that the head will be or become aligned with an initial data track following the BOT hole. However, if calibration tracks are not detected by the read/write head, then a more involved and time consuming routine is executed by which the locations of the calibration tracks are determined and written with minimal positional error. This process of determining, writing and checking forward direction and reverse direction calibration tracks can take as much as 20 to 30 seconds when the cartridge is first loaded into the tape drive. Once written the calibration tracks essentially provide a registration point for all subsequently written data tracks and thereby provide compatibility between different tape drives and cartridges of the same product family or standard. An incorrectly positioned calibration track will cause the read/write head to misregister its relative position on the tape, thereby causing all subsequently written data tracks to reflect a like misregistration, with potential subsequent data losses.

The relative tape calibration track location is generally determined by first detecting the a top or bottom edge of the tape, which can be achieved within a specified margin of error of approximately 5-mils. Next, the head actuator assembly will step the read/write head a predetermined number of steps to arrive at the nominal calibration track position. If calibration tracks are magnetically recorded at about the nominal position, those tracks are read and provide head position error values to the head position servo. The head position servo then actuates e.g. a stepper motor which rotates a lead screw for precisely moving the tape head carriage laterally with respect to the tape. This process is iterative and continues until the tape head aligns with the previously written calibration track. Since in some tape drives a lateral offset occurs when tape travel direction is reversed, a reverse direction calibration track is referenced and followed to provide a reverse-direction head position calibration.

As noted above, recent advancements in magnetic tape drive technology have been facilitated by read/write head structures and data processing electronics which are capable of storing and processing increased lineal track and bit densities on magnetic tapes. If the magnetic tape head is employed to write the precise calibration tracks magnetically, a considerable overhead time may be required. While this prior approach is satisfactory, it is slow, and may slow down or delay data block transfers. Thus, a hitherto unsolved need has remained for a method for providing rapid head position calibration in a manner not requiring the tap drive head to write calibration tracks, and in a manner enabling backward compatibility with the prior approaches.

SUMMARY OF THE INVENTION

The present invention provides a tape cartridge carrying tape having written-in-defect servo patterns enabling the tape drive to calibrate a magnetic tape read/write head relative to tape position in minimal time and in a manner overcoming limitations and drawbacks of the prior art.

Specifically, a plurality of minute defect or "hole" patterns are formed along a predetermined longitudinal length of the magnetic tape, not necessarily, but most preferably in the header and/or trailer regions of the tape. Each hole pattern comprises e.g. a number of tiny holes or magnetic defects having a predetermined geometry, such as an inverted "Y" relative to a reference edge of the tape, such that when a write element writes a signal to the tape in the vicinity of the pattern, the defect pattern disturbs or disrupts the magnetic recording pattern in a manner enabling the read element to recover a position error signal which is processed by the tape head servo loop. This loop then causes the head to move in a direction indicated by the error signal. Through an iterative process carried out over the reading of several patterns, the head is brought into convergence with a nominal head lateral position relative to the tape. Separate defect patterns may be used to provide forward direction and reverse direction head position information, and the patterns may most preferably be written at leader and trailer regions of the tape by a precisely positioned and focused laser beam.

In one aspect of the present invention, a magnetic storage tape has a plurality of spaced-apart servo reference patterns formed along a longitudinal reference axis of the tape. The patterns result in a predetermined pattern of coherent magnetic signal disturbances to magnetic tracks when the tracks are written and read across the patterns, such that a tape drive head position servo may adjust lateral position of a magnetic head relative to the tape based on readback of the signal disturbances in order to bring the head into precise alignment with the longitudinal reference axis.

In a further aspect of the present invention, a method is provided for positioning a magnetic head at a calibration track location on a magnetic storage tape defined by a plurality of longitudinally-aligned alike defect patterns spaced along a predetermined longitudinal reference locus. In this method the magnetic tape is streamed between a magnetic tape cartridge and a magnetic tape storage subsystem. The tape cartridge includes a housing having a central hub with the magnetic tape spooled thereon and the storage system includes an internal take-up reel. The method comprises the steps of:

loading the tape cartridge into the tape storage subsystem, engaging a leader of the tape cartridge, drawing the leader and tape into the magnetic tape storage subsystem, sensing a tape edge, laterally displacing the read/write head a predetermined distance from sensed edge of the tape to an approximate lateral vicinity of the reference locus, and magnetically sensing at least one of the defect patterns and electromechanically adjusting the relative lateral position of the magnetic head with respect to the sensed defect patterns to move the head toward the longitudinal reference locus.

As a related aspect of the present invention, a method is provided for creating defect patterns on a magnetic tape such that the patterns may later be used by the tape drive for very rapid convergence of the tape head to a reference track position of the tape, as established by the defect patterns. In this aspect, the method calls for forming at least one servo reference pattern at a longitudinal reference axis of the magnetic recording tape. The pattern causes a predetermined disturbance to a coherent magnetic signal subsequently recorded along longitudinal magnetic recording tracks written and read across the pattern such that a tape drive head position servo obtains a position error signal of lateral offset of a magnetic head relative to a desired longitudinal reference position. The method includes the steps of placing the tape into registration with a pattern-forming apparatus, such as a precisely positioned and directed energetic laser beam, and causing the pattern forming apparatus to form the servo reference pattern as a predetermined pattern of physical defects ablated by the laser beam in the tape.

The present invention thereby provides an improved method of precisely positioning a magnetic tape read/write at a calibration track location within a minimal time. Furthermore, the present invention provides a method of precisely determining a magnetic tape calibration track location.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the drawings:

FIG. 2A is a diagrammatic view of an end portion of the tape spooled onto a cartridge of the type shown in FIGS. 1 and 2, showing a series of aligned, longitudinally offset servo defect or hole patterns formed in accordance with principles of the present invention.

FIG. 3 is a diagrammatic elevational view of a magnetic tape having a plurality of longitudinally aligned defect or hole patterns in accordance with principles of the present invention.

FIG. 4 is a greatly enlarged view illustrating a presently preferred defect pattern of one of the FIG. 2 servo patterns.

FIG. 5 is a greatly enlarged view of the FIG. 4 defect pattern at the vicinity of a reference track location.

DETAILED DESCRIPTION OF THE PREFERRED EMBODIMENT

Figure 1:
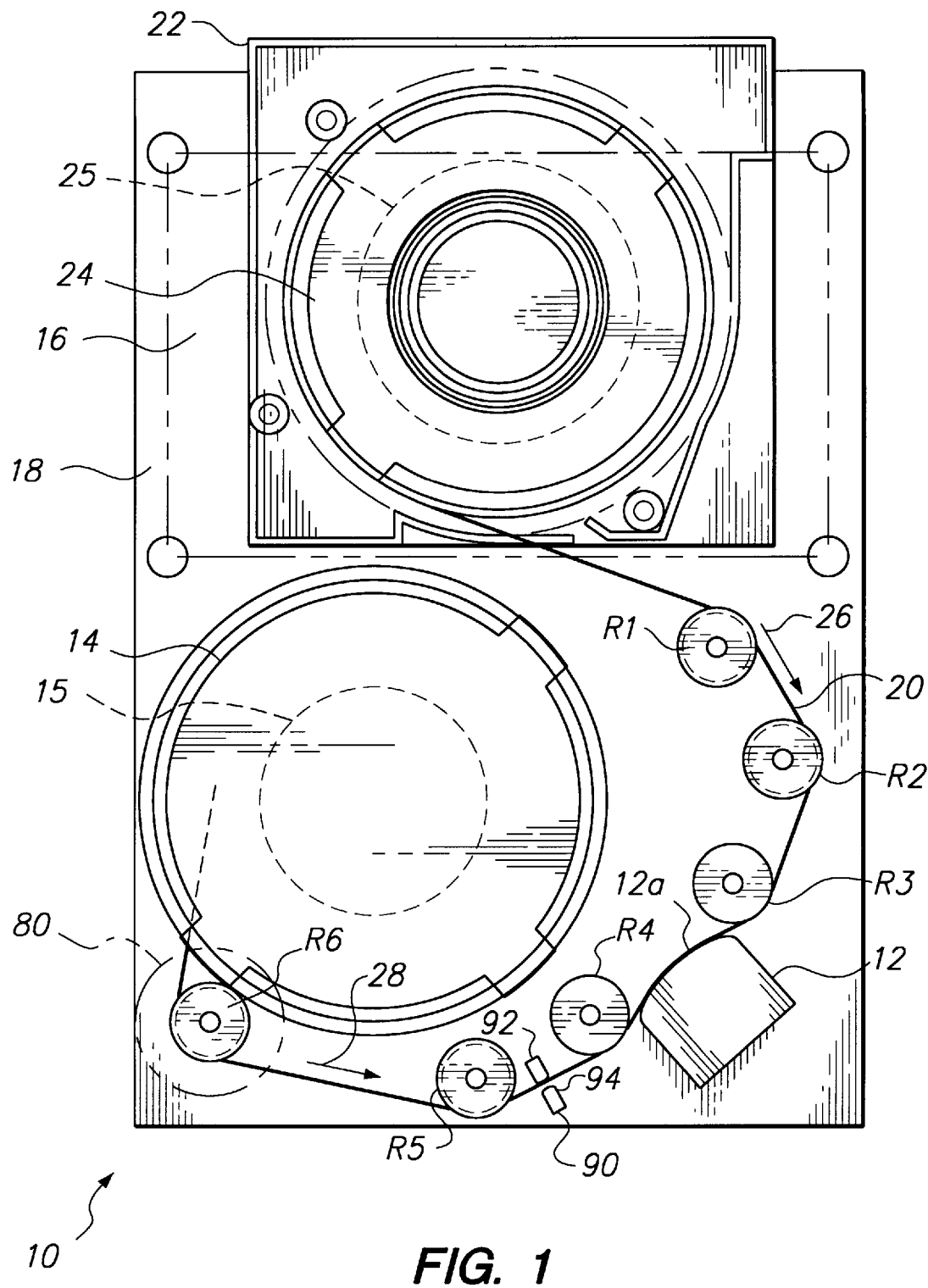
FIG. 1 is a diagrammatic top plan view of a magnetic tape drive and a single reel tape cartridge installed thereon, showing a preferred tape path between feed and take up reels.
Figure 2:
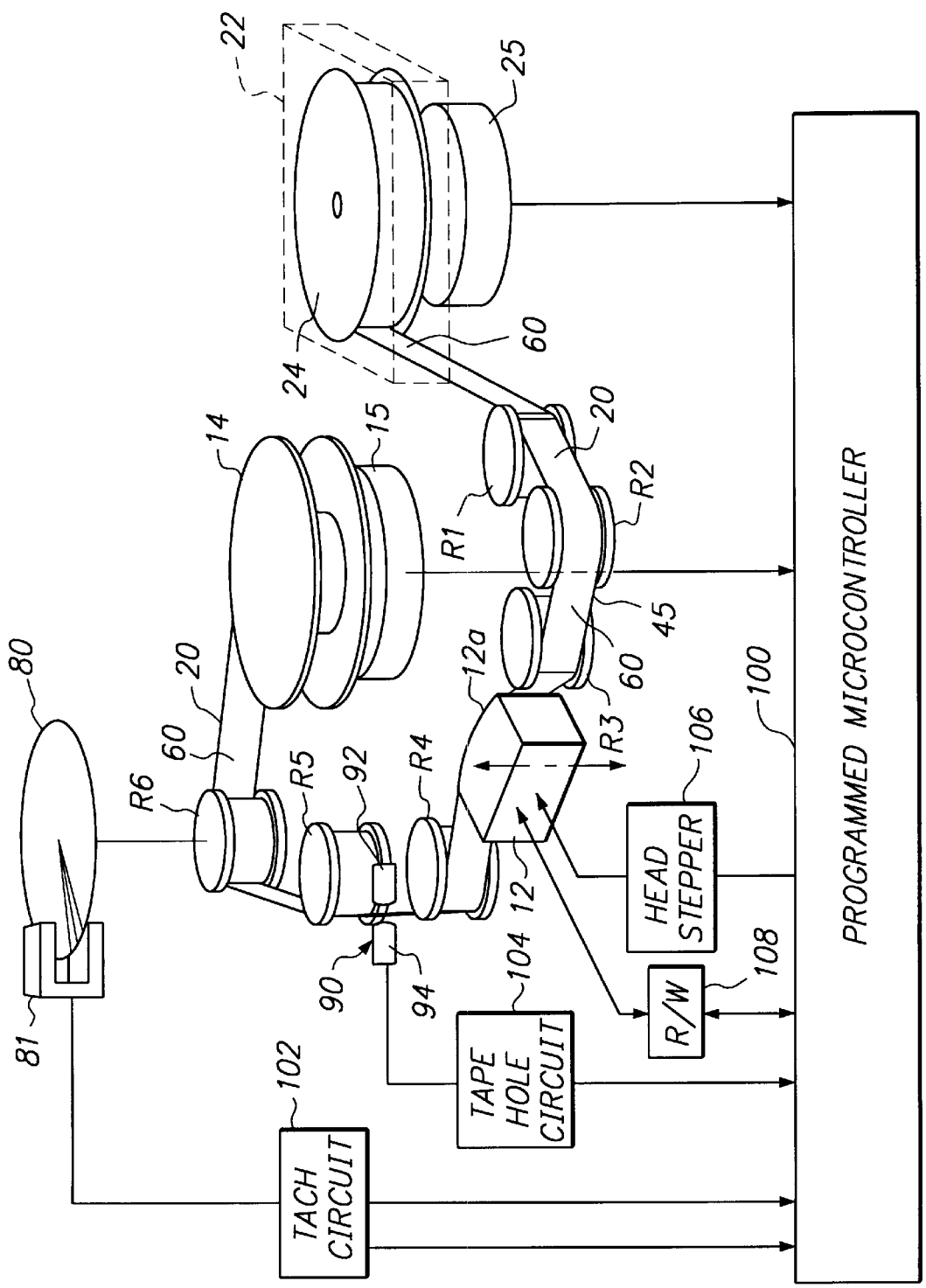
FIG. 2 is another diagrammatic block diagram of the FIG. 1 tape drive showing functional electrical blocks in association with some of the FIG. 1 tape drive's mechanical, electromechanical and electromagnetic elements.

A single-reel cartridge handling tape drive assembly 10 is shown in the FIG. 1 plan view, and in the FIG. 2 diagrammatic system view. The assembly 10 includes a tape head 12 including at least one read element 50 and at least two write elements 55 (one for forward-direction writing, and one for reverse-direction writing). The tape drive 10 also includes an internal take-up reel 14 driven by a take-up reel drive motor 15, and a tape cartridge receiver 16. These elements are contained within a housing 18. Magnetic recording tape 20 of a predetermined particular type is provided to tape drive assembly 10 by insertion of a cartridge 22 containing tape 20 into the tape cartridge receiver 16. After being engaged by a buckling mechanism of the type described in commonly assigned U.S. Pat. No. 4,720,913 for "Mechanism for Joining Tape Leaders" (the disclosure thereof being incorporated herein by reference), the tape 20 is spooled off of a cartridge supply reel 24, with an outermost tape leader being wound onto the internal take-up reel 14.

The tape cartridge receiver 16 includes a supply reel drive motor 25 which engages and drives supply reel 24 when the cartridge 22 is loaded into the cartridge receiver 16. The motors associated with reels are driven by a motor control circuit (not shown) such as the circuit described in the present coinventors' commonly assigned U.S. Pat. No. 5,216,556 for "Method for Optimized Tape Tension Adjustment for a Tape Drive", the disclosure thereof being incorporated herein by reference.

It is conventionally necessary to constrain the tape 20 against lateral (up and down) movement as it traverses a face 12a of the magnetic head assembly 12 in order to keep the parallel data tracks defined on the tape 20 in alignment with transducing elements carried within the head assembly 12. It is also necessary to maintain the tape 20, which may be of varying thickness, depending upon the particular plastic substrate, very flat against the transducing face 12a of the head assembly 12. Accordingly, in a preferred embodiment a series of six tape guide rollers are used to constrain 0.5 inch wide tape (of predetermined varying thicknesses) in place across the head structure 12. These rollers are shown in FIGS. 1 and 2 as rollers R1, R2, R3, R4, R5 and R6. Presently preferred embodiments of the rollers R1–R6 are set forth in commonly assigned U.S. Pat. No. 5,173,828 for "Compact Multiple Roller Tape Guide Assembly", and in commonly assigned U.S. Pat. No. 5,414,585 for "Rotating Tape Edge Guide", the disclosures thereof being incorporated herein by reference.

The tape path extends longitudinally from the supply reel 24 within the cartridge 22, across an outside face of each of rollers R1, R2 and R3, across the head transducing face 12a, along the outside face of each of rollers R4, R5 and R6 and to internal take-up reel 14. In general the tape 20 may be driven in either forward direction 26 or reverse direction 28 to write data onto selected data track locations, or to read data from selected data tracks, of the tape 20. The tape 20 is rewound in reverse direction 28 back onto supply reel 24 before tape 20 in the tape cartridge may be released and withdrawn from the tape drive assembly 10.

One of the tape guide rollers, roller R6 is coupled to an optical tachometer encoder disk 80 which generates signal patterns in relation to actual tape velocity in the forward 26 and reverse 28 tape directions. A tachometer module 81 generates a collimated light beam which passes through the encoder disk 80 to a photo detector array which puts out electrical signals in quadrature relationship indicative of both velocity and direction of movement of the tape 20. A preferred form of tachometer roller R6 is given in commonly assigned U.S. Pat. No. 5,088,172 for "Tape Drive Assembly with Non-Slip Tachometer Roller", the disclosure thereof being incorporated herein by reference.

A second optical sensing module 90 including a light source 92 and collimated photo detector 94 is positioned between tape guide rollers R4 and R5. The sensing module directs a light beam at the tape in longitudinal alignment with BOT 32 and EOT 34 holes which are defined in the tape 20 and which are used by the tape drive assembly 10 to reverse the direction of movement of the reels 14 and 24, or to reduce streaming speed, in the event that the leader is being spooled from the take-up reel onto the supply reel 24 during a tape unthreading operation, during which the buckling mechanism is released, thereby facilitating removal of the tape cartridge 22. Typically, the BOT 32 and EOT 34 holes are defined at locations near the respective ends of the strand of tape 20 coiled on the supply reel 24, such as at locations approximately 27 feet respectively from each end.

Since the tape drive assembly 10 receives rotational velocity inputs from the take up reel motor 15, the supply reel motor 25 and the encoder wheel 80, by spooling relatively short lengths of tape, the assembly can measure the change in velocity at e.g. the take up reel motor 15 in relation to tape velocity measured at the encoder wheel 80 in order to determine tape thickness.

As shown in FIG. 2, in accordance with aspects of the present invention, the tape drive assembly 10 also includes a programmed microcontroller 100 which is connected to a tachometer circuit 102 coupled to the tachometer optoelectronic module 81, a tape hole circuit 104 which is coupled to the tape hole optoelectronic module 90, a stepper-motor based head positioner assembly 106 for positioning the head 12 laterally with respect to the tape and at a desired azimuth angle during azimuth recording and playback, and a read/write channel 208 which provides digital values read from the tape to the microcontroller 100 for completing a servo feedback control loop for the head positioner 106. The electrical signal paths leading to and from the programmed microcontroller 100 enable the tape drive assembly 10 to calibrate itself relative to the cartridge 22, to format data tracks via write transducers included within the tape head assembly 12, to sense velocity of the take-up reel motor 15 and velocity of the supply reel motor 25 and to locate the BOT 32 and EOT 34 holes formed in the tape 20.

The tape drive assembly 10 is typically initialized for accepting the magnetic tape cartridge 22, which is then inserted into the cartridge receiver 16. Verification that the magnetic tape cartridge 22 is present within the magnetic tape storage subsystem 25 may then be accomplished by means of any suitable transducer, such as a micro-switch (not shown). Thereafter, the magnetic tape 20 is connected the take-up reel 14 by means of the buckling mechanism (not shown) and then the magnetic tape 20 may be streamed back and forth between the magnetic tape cartridge 22 and the tape drive 10.

During an initialization routine, a tape edge region 45 is sensed by turning on the write current of a write element 55 of the read/write head 12 and stepping the read/write head 12 laterally over the streaming magnetic tape 10 (as denoted by the dashed up-down arrow associated with head 12 in FIG. 2). The write element 55 is energized with a suitable low frequency signal (1F) and the read element 50 in line with the write element 55 begins to pick up and play back the 1F signal as the tape edge 45 is reached during the lateral movement of the head 12. Once a signal is detected by the playback element at a level above a predetermined noise level threshold, the microcontroller 100 determines that the tape edge 45 has been located. The position of the read/write head 12 when the edge region 45 of the magnetic tape 20 is detected is stored in a register within microcontroller 100 as a reference location. The read/write head 12 is then laterally transposed laterally to a nominal reference track location by the head actuator 106 operating "open loop". If a reference track pattern is sensed by the read element 50, then the microcontroller 100 closes the head position servo loop and commands the head positioner 106 to adjust the head lateral position to align with the reference track during a head fine-positioning routine. Tape direction is then reversed, and a reverse direction reference track is then sensed, and the fine-positioning routine is carried out for the reverse direction. The forward direction and reverse direction reference tracks are preferably located between the tape leader and the BOT 32 hole, so that this overhead information does not reduce storage space in the user data storage areas between the BOT 32 and EOT 34 holes. Forward and reverse direction reference tracks are also typically provided between the EOT 34 hole and an inner end of the tape coiled around reel 24 at its inner hub. These inner reference tracks are also preferably checked and head calibration values recorded in registers of microcontroller.

If reference tracks are not found in the tape 20, then, conventionally, a rather involved routine is executed to determine approximate locations for the forward and reverse direction reference tracks, by conducting a series of streaming operations followed by writing forward direction and reverse direction reference tracks at the BOT 32 end and at the EOT 34 end of the tape. This procedure may require as much as 20 to 30 seconds, or longer, to accomplish.

In accordance with principles of the present invention, the time-consuming procedure for establishing reference tracks is eliminated by providing a series of servo reference patterns 60 in the tape 20, preferably, although not necessarily, at the time of cartridge manufacture and/or assembly. The patterns 60 are permanently defined in the tape 20, and are most preferably formed as a series of minute holes precisely etched or formed by a suitably energetic laser beam. Several of these patterns 60 are shown formed in longitudinal alignment in the tape 20 as it is threaded along the tape path of the tape drive assembly 10 in FIG. 2.

FIG. 3 provides a greatly enlarged view of one of the servo patterns 60. This pattern 60 e.g. nine separate holes arranged as e.g. an inverted "Y" shape. The holes a1 and a2 are longitudinally aligned and spaced apart a first predetermined distance. Holes b1 and b2 are also longitudinally aligned and positioned above holes a1 and a2; holes b1 and b2 are spaced apart but at a distance less than a1 and a2. Holes c1 and c2 are above b1 and b2, are aligned longitudinally, and are spaced apart by a distance less than holes b1 and b2. In the example of FIG. 3, the holes a1, a2, b1, b2, c1 and c2 form an aligned inverted V along a convergence path focused at a seventh hole e2. Holes f1 and g1 are provided laterally above hole e2 in the FIG. 3 pattern 60 and are spaced apart a distance equal to the spacing between holes a1,2 and b1,2, and holes b1,2 and c1,2. As shown in FIG. 4, holes c1, e2 and c2 are closely spaced together, such that the read element 50 will traverse at least portions of the holes when following a center line of a reference track position on the tape 20.

Despite the fact that the tape 20 is precisely guided past head 12 by the tape guide rollers, e.g. rollers R1, R2, R3, R4, R5 and R6 shown in FIGS. 1 and 2, the edge of the tape flaps laterally, usually within a tolerance of about 5–10 millinches, and so the tape edge-locating routine described above may have a 5–10 millinch inaccuracy or tolerance from nominal. Each hole in the FIG. 3 pattern 60 is suitably sized relative to the lateral motion tolerance. In the preferred example of the present invention, each hole is on the order of 1–2 millinches in diameter. The holes are spaced apart laterally to cover e.g. about 10 millinches of the tape's width dimension (typically, although not necessarily, about ½ inch). The inverted "Y" hole pattern 60 is principally suited to a read/write head 12 that operates by first sensing the bottom edge region 45 of the magnetic tape 20 and then steps laterally away from edge 45 ("upwardly" in the sense of FIG. 2) in a coarse positioning mode until the inverted "Y" hole pattern 60 region is reached.

After the tape edge 45 is sensed, and the head 12 is laterally displaced to the nominal reference region, the read element 50 is selected to read a reference track. If no reference track is sensed, the next step is to energize the write element either with a robust low frequency reference signal (¾F or 1F, where F is the most robust frequency passing through the readback channel 108) or with a DC erase signal (the 1F signal is presently preferred). The frequency is selected in relation to the diameter of each hole, so that unmistakable drop out or drop in patterns are created in the readback signal.

At some point the write element 55 will pass over a pattern 60, and one or more of the holes a–g will become manifest as signal dropouts sensed by the read element 50 (or as a drop-in pulse if a DC erase signal is being written to the tape). Hereinafter, pulses are used to model the electromagnetic signal response to the hole pattern 60, but those skilled in the art will appreciate that the pulses also symbolize signal dropouts from the non-DC signal written to the tape 20.

If a single drop-out event is detected at the pattern 60, the head 12 is displaced laterally "above" reference centerline, and the microcontroller 100 will cause the head to be laterally displaced toward tape edge 45 by a controlled incremental amount. When the next pattern 60 along the tape 60 is reached, if three drop out events are sensed, the head 12 is very close to being aligned with a reference track centerline, as shown in FIGS. 4 and 5.

Figure 6:
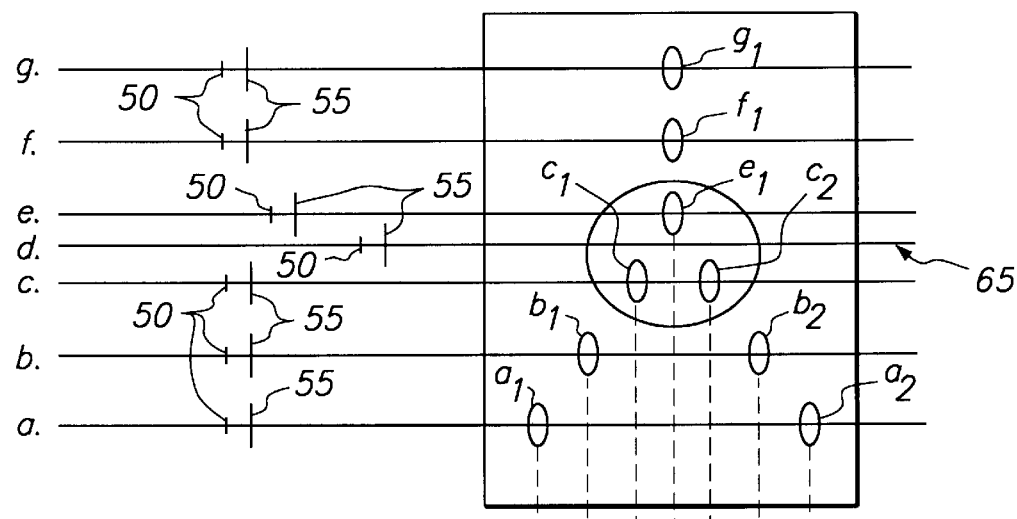
FIG. 6 is a graph of a pattern of pulses sensed by the magnetic tape read element of the FIG. 1–2 tape head at the FIG. 5 reference track location.
Figure 7:
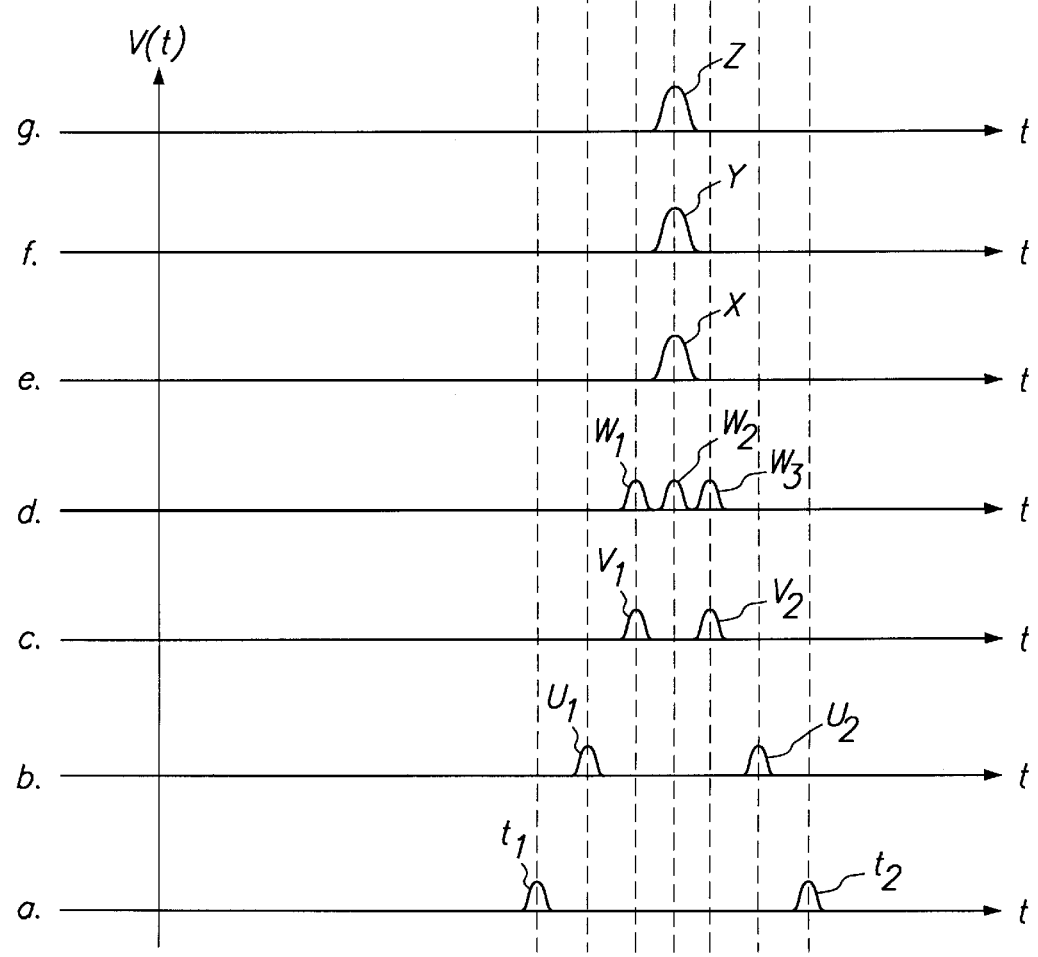
FIG. 7 sets forth aligned graphs a–g which illustrate lateral positions of the FIGS. 1–2 read/write head which is stepped to traverse the servo defect patterns during a head fine-positioning routine.

If, on the other hand, a pair of drop out events are detected at the pattern 60, the head 12 is displaced laterally "below" the reference centerline, and the microcontroller 100 will cause the head 12 to be laterally displaced away from tape edge 45 by a controlled incremental amount, depending upon a time interval measured between the two dropout events. For example, in FIGS. 6 and 7, if the read element 50 is following a track labeled "a", it will encounter the a1 and a2 holes and report dropouts at times t1 and t2. This will identify the lateral head position as being aligned with track a. The microcontroller 100 will then cause the actuator 106 to step the head 12 by a first lateral displacement "upwardly" to the reference position d, shown in FIGS. 6 and 7. If the read element 50 is reading the signal along a track b, then dropout events b1 and b2 will be encountered and be separated by a time interval v1–v2. This position and time displacement is used by the microcontroller 100 to cause the head 12 to be moved "upwardly" to the reference position d by a second lateral displacement less than the first displacement associated with track a. At track c, the c1 and c2 holes will be encountered, separated by a time difference v1–v2, and a third, very short lateral displacement will be determined and applied by the microcontroller 100.

Since there is a sequential series of servo patterns 60 spaced longitudinally apart along the reference track of tape 20, (four patterns 60 are shown in FIG. 2A), the head position servo acts iteratively to read and correct for head position. A first pattern 60 results in a first, approximate correction to the vicinity of track d, and subsequent patterns are read and used as needed to bring the head into alignment with the desired track, track d. Once the head 12 has been converged to the reference track position, the head 12 is then, or accurately can be, aligned with a first data track location, e.g. track zero, which is reached after the BOT 32 hole is sensed by the sensing mechanism 90 and tape hole circuit 104.

Desirably, the sequence of servo patterns 60 will be inscribed onto tape 20 at both the outer end and the inner end of the tape. The tape 20 tends to shift laterally as streaming direction is changed from forward to reverse direction. By providing a series of patterns 60 at the inner end of the tape 20, once a forward direction pass through the tape has been completed, the tape is pulled past the EOT 34 hole, and direction is reversed after the sequence of inner servo patterns 60 is passed. Then, the calibration procedure noted above for the forward direction is repeated for the reverse direction.

Thus, those skilled in the art will appreciate that the new tape drive assembly 10 will work with a conventional cartridge to locate or create reference tracks via magnetic recording, at the expense of an initial, substantial calibration routine interval. If a "fast" cartridge 20 having the sequence of servo patterns 60 is loaded into the new tape drive assembly 10, and reference tracks are not sensed magnetically, then the servo patterns 60 will enable the drive 10 to calibrate head position very rapidly, because the tape 20 may be streamed at a very high velocity by the calibration patterns 60, rather than at a much slower rate associated with the conventional reference track determining and writing operation. If a "fast" cartridge 20 is loaded into an older tape drive not equipped to handle the servo patterns 60, then reference tracks will be determined and written magnetically, albeit over the longer conventional tape head position calibration interval heretofore required. Thus, the new cartridge 20 is fully backward-compatible with existing machines, and significantly improves the calibration performance of new tape drives 10 equipped to utilize effectively the series of servo patterns 60.

Figure 8A:
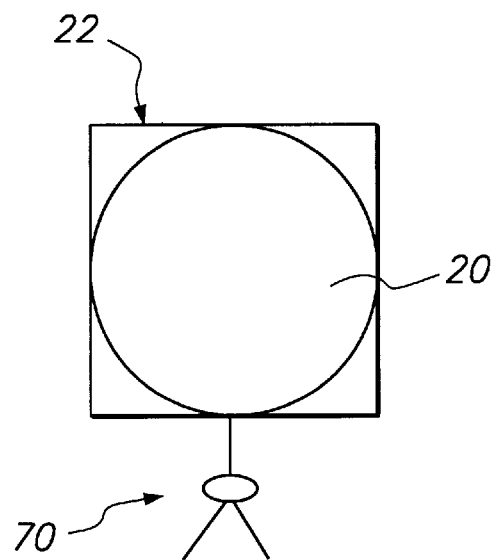
FIG. 8a is a highly diagrammatic plan view of a first preferred method for imposing the servo hole or defect patterns into the tape.
Figure 8B:
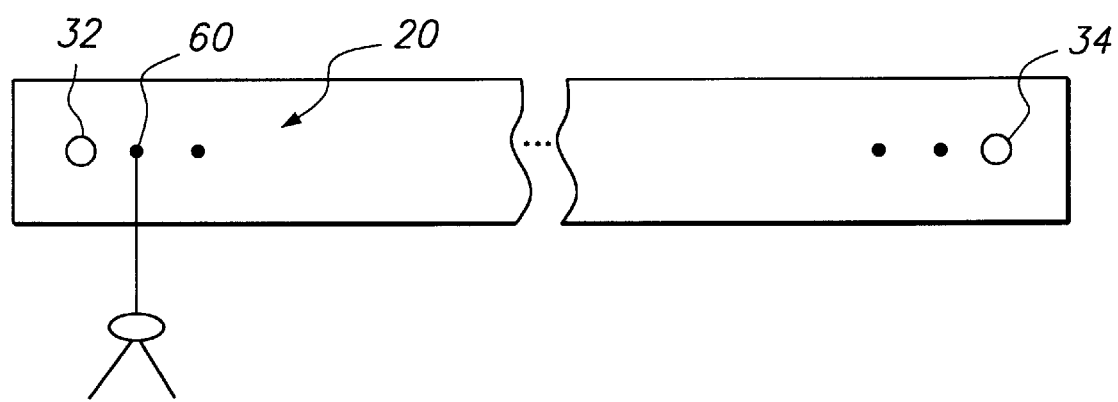
FIG. 8b is a highly diagrammatic plan view of a second preferred method for forming or imposing the servo hole or defect patterns into the tape during cartridge assembly.

Referring to FIGS. 8*a* and 8*b*, first and second preferred methods are illustrated for forming the hole patterns 60 on the magnetic tape 20. In the FIG. 8*a* example, a laser beam 70 is focused toward the spool of tape already coiled onto reel 24 of the cartridge 22. Since the tape leader is formed of a plastic film material not substantially dissimilar to the material comprising a substrate of the tape 20, the energetic beam from laser 70 may be of sufficient magnitude to penetrate and ablate the tape to a depth of e.g. 10–15 tape layers, those being layers of the tape 20 in the spool ahead of the BOT 32 hole. One advantage of the FIG. 8*a* approach is that if the tape is accurately spooled onto cartridge reel 24, one laser etching operation can be employed to write all of the patterns in one procedure. Drawback of the FIG. 8 approach are that multiple cartridge handling steps are required, and the series of servo patterns 60 may not be written in this manner to the tape at the inside of the EOT 34 hole adjacent the hub of cartridge reel 24.

FIG. 8*b* shows a most preferred laser etch method. In this method a laser 70 performs a precise etching process as the magnetic tape 20 is being spooled onto the tape cartridge 20. A very precise positioning mechanism (not shown) is provided to guide the tape 20 past the laser etching station in cartridge assembly. The tape is guided in reference to the reference edge 45 which is employed by the tape drive 10 in finding the tape edge, as described above. Whether the FIG. 8*a* or FIG. 8*b* setup is employed to establish the patterns 60, it will be appreciated that the laser 70 is capable of being very precisely positioned and repositioned in order to provide the selective, precise ablation needed to create the holes or defects of each pattern 60. While other hole-pattern forming processes, such as one using a miniature stylus or die, may be employed, the laser beam 70 is presently most preferred for creating patterns 60.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A magnetic storage tape having at least one servo reference defect pattern physically formed at a longitudinal reference location of the tape, the servo reference defect pattern comprising a series of laterally spaced-apart holes defined in the tape, the defect pattern resulting in a predetermined coherent magnetic signal disturbance to magnetic tracks written and read across the pattern, such that a tape drive head position servo receives a position error signal and adjusts lateral position of a magnetic head relative to the tape based on readback of the signal disturbance in order to move the head toward alignment with the longitudinal reference position.

2. A magnetic storage tape having a plurality of servo reference defect patterns physically formed along a longitudinal axis of the tape, each of the servo reference defect patterns comprising a series of laterally spaced-apart holes defined in the tape, the defect patterns resulting in predetermined coherent magnetic signal disturbances to magnetic tracks written and read across the patterns, such that a tape drive head position servo receives position error signals and iteratively adjusts lateral position of a magnetic head relative to the tape based on readback of the signal disturbances in order to move the head into alignment with the longitudinal axis.

3. The magnetic storage tape set forth in claim 2 wherein the tape is spooled in a tape cartridge.

4. The magnetic storage tape set forth in claim 3 wherein the tape cartridge includes beginning-of-tape and end-of-tape holes, and the servo reference patterns are written to an area of the tape outside of a span thereof between the beginning-of-tape hole and the end-of-tape hole.

5. The magnetic storage tape set forth in claim 4, wherein the servo reference patterns are formed at end regions of the tape beyond the beginning of tape and end of tape holes, a forward-direction servo pattern being beyond the beginning-of-tape hole towards the end of the tape, and a reverse-direction servo pattern being beyond the end-of-tape hole towards the beginning of the tape.

6. The magnetic storage tape set forth in claim 2 wherein the servo reference patterns of the series have an identical geometry on a major plane surface of the tape.

7. The magnetic storage tape set forth in claim 2 wherein the servo reference pattern comprises an inverted "Y" shaped pattern of holes relative to a reference longitudinal edge of the tape.

8. The magnetic storage tape set forth in claim 2 wherein each servo reference pattern comprises a pattern of holes formed in the tape, the pattern defining a predetermined array of holes which diverge away from a reference spot at a center of the pattern.

\* \* \* \* \*